(12) United States Patent
Berrill

(10) Patent No.: US 8,407,615 B2
(45) Date of Patent: Mar. 26, 2013

(54) METHOD OF DISPLAYING AND INTERACTING WITH INFORMATION ON A ROTARY FABRIC

(75) Inventor: Arthur R. Berrill, Ontario (CA)

(73) Assignee: Pitney Bowes Software Inc., Troy, NY (US)

( * ) Notice: Subject to any disclaimer, the term of this patent is extended or adjusted under 35 U.S.C. 154(b) by 1758 days.

(21) Appl. No.: 11/147,445

(22) Filed: Jun. 8, 2005

(65) Prior Publication Data

US 2006/0282792 A1  Dec. 14, 2006

(51) Int. Cl.
*G06F 3/048* (2006.01)
(52) U.S. Cl. ........ 715/781; 715/810; 345/419; 345/427; 345/563; 345/569
(58) Field of Classification Search .................. 715/781; 345/427, 782, 563, 779, 569; 348/569
See application file for complete search history.

(56) References Cited

U.S. PATENT DOCUMENTS

| | | | |
|---|---|---|---|
| 5,678,015 A * | 10/1997 | Goh | 715/782 |
| 6,005,579 A | 12/1999 | Sugiyama et al. | |
| 6,266,098 B1 * | 7/2001 | Cove et al. | 348/563 |
| 6,597,358 B2 * | 7/2003 | Miller | 345/427 |
| 2002/0069415 A1 * | 6/2002 | Humbard et al. | 725/52 |
| 2003/0142136 A1 | 7/2003 | Carter et al. | |

FOREIGN PATENT DOCUMENTS

WO   WO 01/67220 A1   9/2001

OTHER PUBLICATIONS

Jun Rekimoto and Mark Green, "The Information Cube: Using Transparency in 3D Information Visualization," Proceedings of the Third Annual Workshop, Dec. 5, 1993, pp. 125-132.*
J. Rekimoto et al., "The Information Cube: Using Transparency in 3D Information Visualization," Proceedings of the Third Annual Workshop, Dec. 5, 1993, pp. 125-132.*
"Selection Cube," IBM Technical Disclosure Bulletin, IBM Corp. New York, US, vol. 34, No. 11, Apr. 1, 1992, p. 19.

* cited by examiner

*Primary Examiner* — Michael Roswell
*Assistant Examiner* — Andres E Gutierrez
(74) *Attorney, Agent, or Firm* — Michael J. Cummings; Charles R. Malandra, Jr.; Steven J. Shapiro

(57) ABSTRACT

A system and method by which menus, displays, charts, maps and pictures may be presented to a user and very quickly seen and used in the context of a larger display without obscuring key elements of that display. Menus or other graphical displays are anchored to the sides of a solid figure, which can be rotated to display the menu panels and other textual and graphical information.

7 Claims, 13 Drawing Sheets

160

METHOD OF DISPLAYING AND INTERACTING WITH INFORMATION ON A ROTARY FABRIC

FIELD OF THE INVENTION

This invention relates to displaying a large amount of information to a user in a readily accessible manner, specifically to a means by which menus, displays, charts, maps and pictures may be presented to a user and very quickly seen and used in the context of a larger display without obscuring key elements of that display.

BACKGROUND OF THE INVENTION

Pull-out menus, also known as pull-down menus, are well known in the art and are possibly one of the most common tools in a graphical user interface (GUI). From a pull-down menu, a user can issue a computer command, initiate an action, set parameters for a particular operation, etc.

Since the pull-down menu structure is so popular, occasionally the entire viewing screen is not sufficient to display all of the menu options, i.e., panels, available to the user. This is particularly true if each of the menu panels occupies a large area on the screen so as to provide the user with a readable, easy to understand format. In this case, the user must scroll the display past the current view, either in the vertical or horizontal direction, in order to create a viewing area where the additional panels can be seen. This scrolling operation may be inconvenient and time consuming for the user.

Furthermore, traditional pull-down menus feature cascading menus which are typically sub-menus pertaining to a particular panel within the main menu. Each sub-menu can have several of its own sub-menus, and so on. There can thus be many levels of sub-menus, each relating to a panel in the "parent" menu. In this case, the viewing area on the screen may not be sufficient to provide space for each panel while allowing the user to comprehend its contents. Scrolling the sub-menus off the screen presents difficulties in addition to those mentioned, since the user may "lose" track of where he or she is in the overall scheme of things (i.e., which panel this particular sub-menu is related to).

Additionally, many user intensive applications such as a business intelligence study need to display a large amount of information in a readily accessible manner, including for example charts, forms for setting parameters, maps, pictures and videos. Each of these takes up space on the display, which thus becomes unmanageable. Some predictive analytics applications, for example, have hundreds of variables that can be set by the user and are used in analyses for a single decision, thus, giving analysts a cumbersome amount of data to be viewed. Traditional menus and display panels are intrusive and difficult to present in the context of the user's interaction with the main display. These menus and panels are also distracting to the user due to the excess amount of information presented at one time.

Therefore, a need exists to overcome the above disadvantages of current menu approaches and information display structures.

BRIEF SUMMARY OF THE INVENTION

The present invention meets the above-stated needs, by providing a means by which menus, displays, charts, maps, and pictures may be efficiently presented to a user. To accomplish this, the present invention anchors menus, charts, maps, and pictures or other displays to the sides of a solid figure which is rotatable. The present invention converts massive amounts of information into a format that is very quickly seen and can be used in the context of a larger display without obscuring key elements of that display. The use of a solid allows the next and previous panels of information to be viewed as well, providing a context for the current panel and allowing the user to quickly move through a series of representations of information efficiently and quickly.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

The present invention is a means by which menus, displays, charts, maps, and pictures may be presented to a user and very quickly seen and used in the context of a larger display without obscuring key elements of that display. In one embodiment, the invention anchors menus or other graphical displays to the sides of a solid figure, which may be rotated. The figures also show a financial analysis example, however, it is appreciated that the invention may be used to display any type of information, text, data, graphics, video, etc. The invention is a rotary menu in which any type of material can be displayed.

Figure 1:
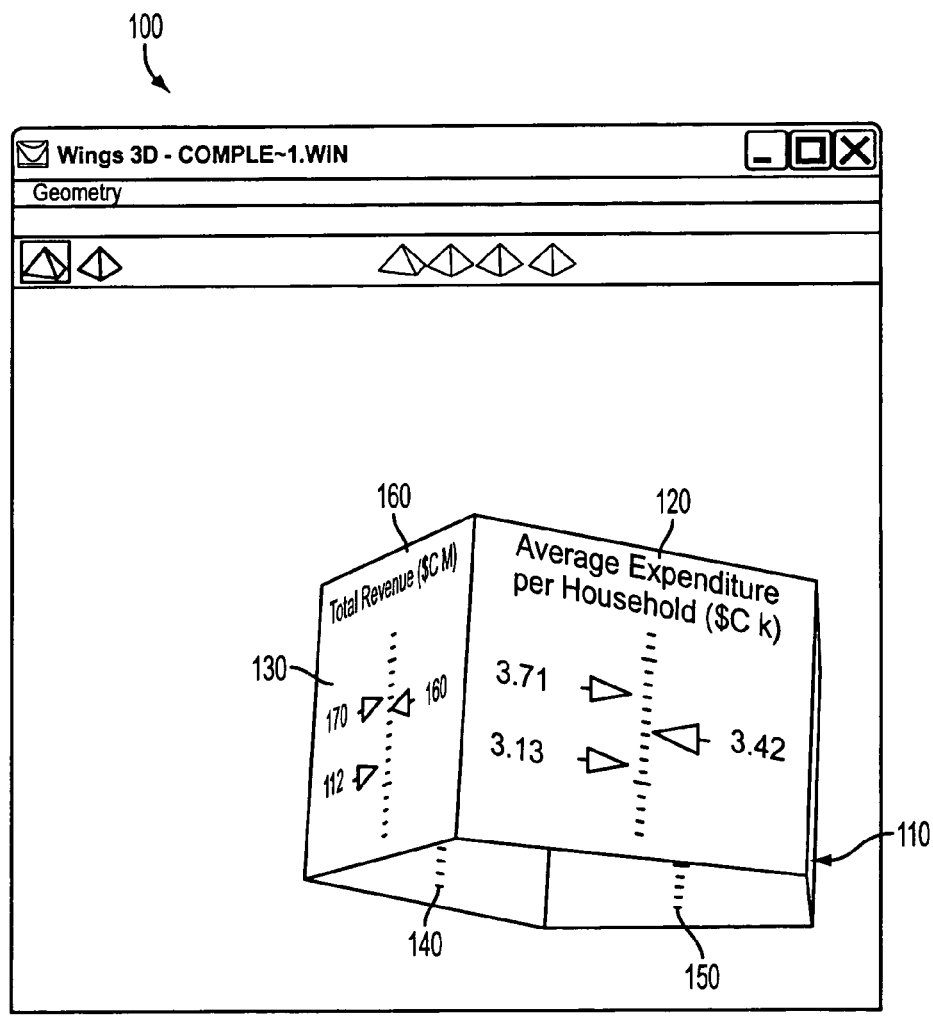
FIG. 1 is an illustration of an exemplary embodiment of the present invention.

FIG. 1 represents a display screen 100 displaying various panels, i.e., panel faces 110, 120, 130, 140 and 150, arranged as a semi-cylindrical solid figure 160. The panels form a novel graphical menu or presentation on the screen of a computer system.

The user refers to each panel via an input device (not shown), such as a mouse, light pen, keyboard, etc., where each panel represents data or closely related information to be displayed by the computer system. Representative operations may include displaying an image on the screen such as a table or graph, compiling a spreadsheet, collecting text, lining up icons, or any other desired application.

Figure 2:
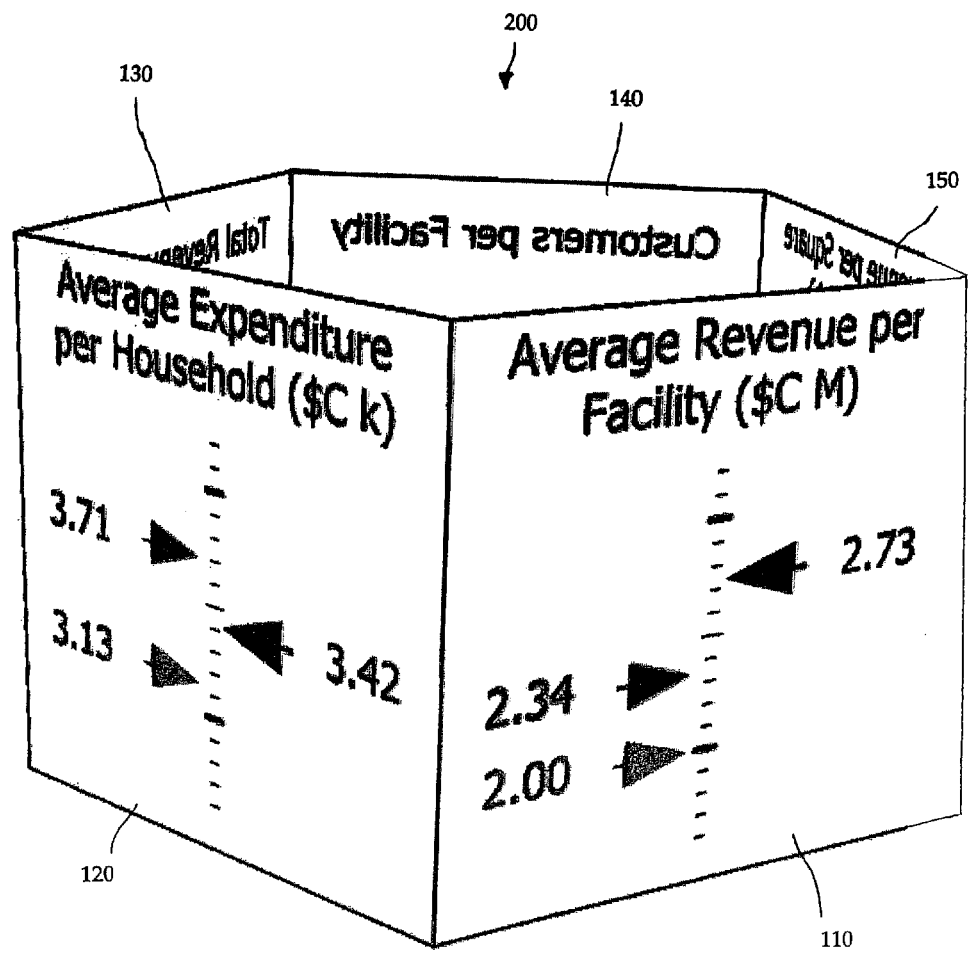
FIG. 2 is an illustration of the solid figure according to the present invention.

In accordance with one aspect of the present invention, when the user selects (i.e., refers to) a set of information via the input device, that information is obtained from the system's data source. The information and appropriate window, menu, or graphical display is displayed on a panel or panels of the solid figure 160, as shown in FIG. 2. The face of an adjacent panel is also visible so the user knows which direction to spin the figure 160.

For example, with reference to FIG. 2, the user points a cursor at the "Total Revenue" panel 130 in the main menu 200. As soon as the user references that panel, it will face the user and become more visible than any other panel in the main menu 200, i.e., panels 110, 120, 140, and 150. That is, the displayed contents (e.g. the chart) of the referenced panel are displayed so that the user can easily identify where in the menu he or she is, and whether to initiate that particular operation. The panels can also be programmed to constantly rotate, presenting the information on a continuing basis and requiring no user references or cues.

In addition, according to the present invention, each of the display panels do not have to occupy a large area on the screen 100 to have its contents readily visible to the user. In fact, each panel may occupy a relatively small display area on the screen 100. As the user browses through the information using the cursor, each panel indicated by the user rotates toward the user so that its contents become easily identifiable. And as long as the user refers to a panel by pausing the cursor on it, for example, the panel freezes and faces the user.

Figure 3:
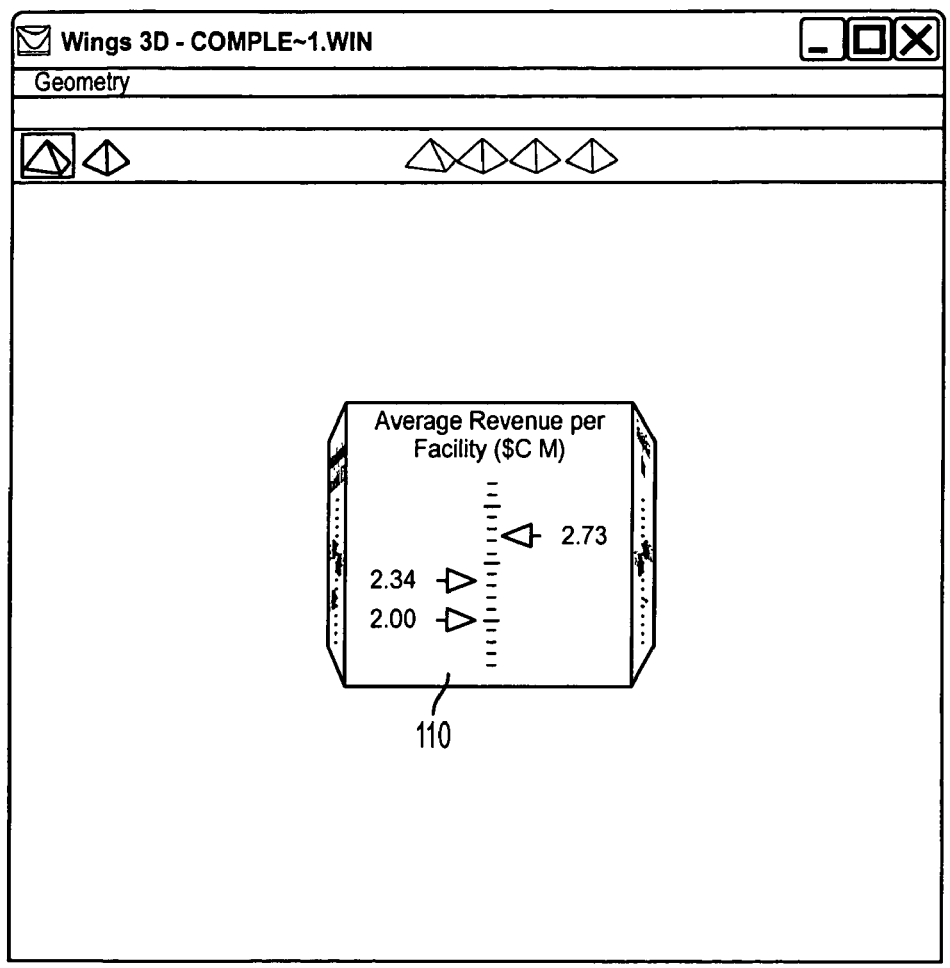
FIG. 3 is an illustration of the exemplary embodiment of the present invention.

FIGS. 2 and 3 illustrate an example of the above operation. After the user references a new panel, e.g., the "Average Revenue per Facility" panel 110, the figure 160 rotates panels 120, 130 to their new position. Specifically, the new position of panel 130 is in the background with all other non-referenced panels in the main menu 200. The "Average Revenue per Facility" panel 110 now faces the user. Therefore, the face of the first main menu panel 130 (FIG. 1) rotates away from the user while the respective second main menu panel 110 comes into view.

Figure 4:
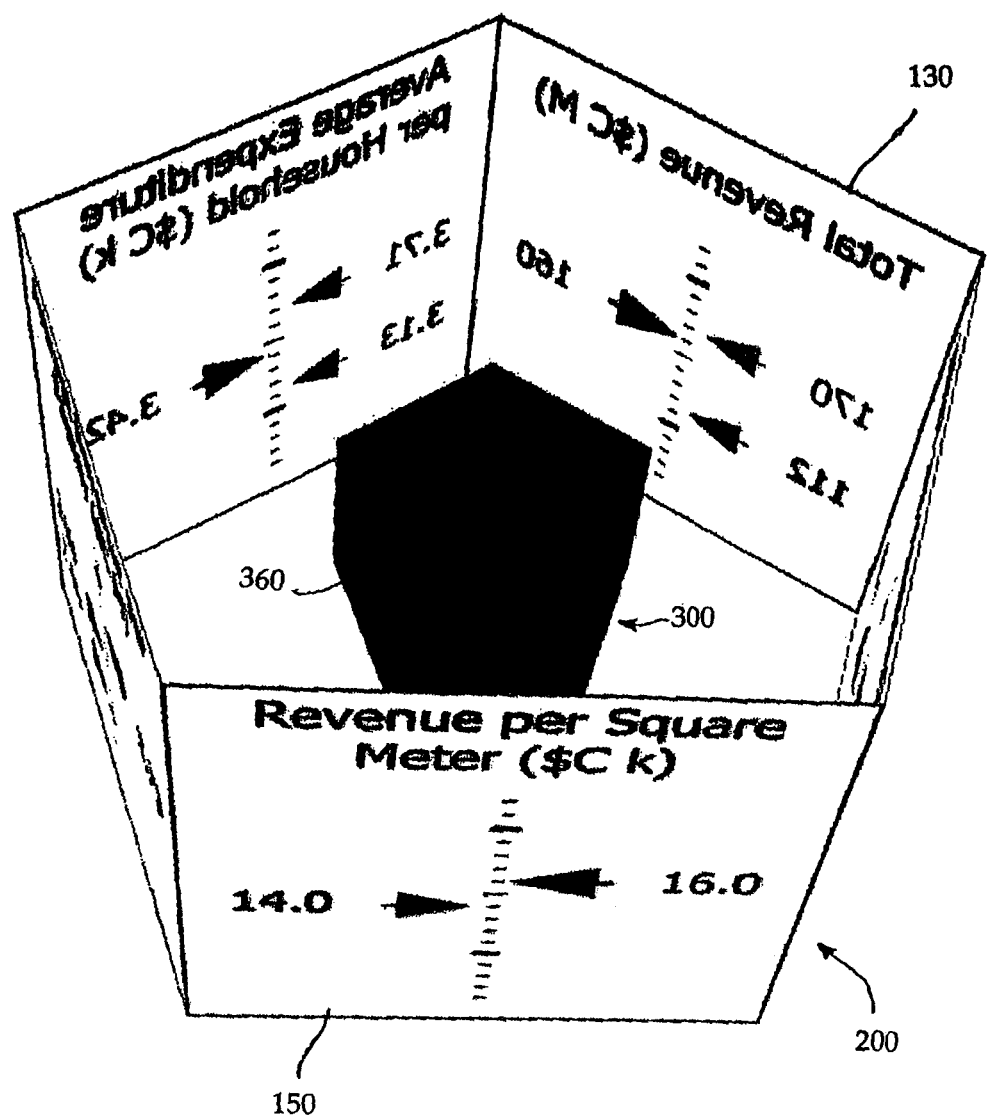
FIG. 4 is an illustration of an interior solid figure within a solid figure depicting another embodiment of the present invention.

Referring to FIG. 4, in accordance with another aspect of the invention, there may be a sub-menu 300 comprising its own panels associated with a particular main menu panel 150. The sub-menu is displayed as a second solid figure 360 within the first solid figure 160. As further illustrated in FIG. 5, when the user selects the particular panel, the user is given access to a sub-menu 300 which is displayed by flowing through the main menu 200 panel to the sub-menu 300 (causing sub-menu 300 to appear on the screen 100). Flowing through is the graphic effect of zooming through the particular panel of the main menu 200 to view the panels of the sub-menu 300. In the illustrated example, the sub-menu 300 representatively contains more detailed information such as a monetary breakdown by source and annual revenue history. The organization scheme of the sub-menu and the numerous methods in which it displays information is application dependent and can reflect any schema desired by the user.

Figure 5:
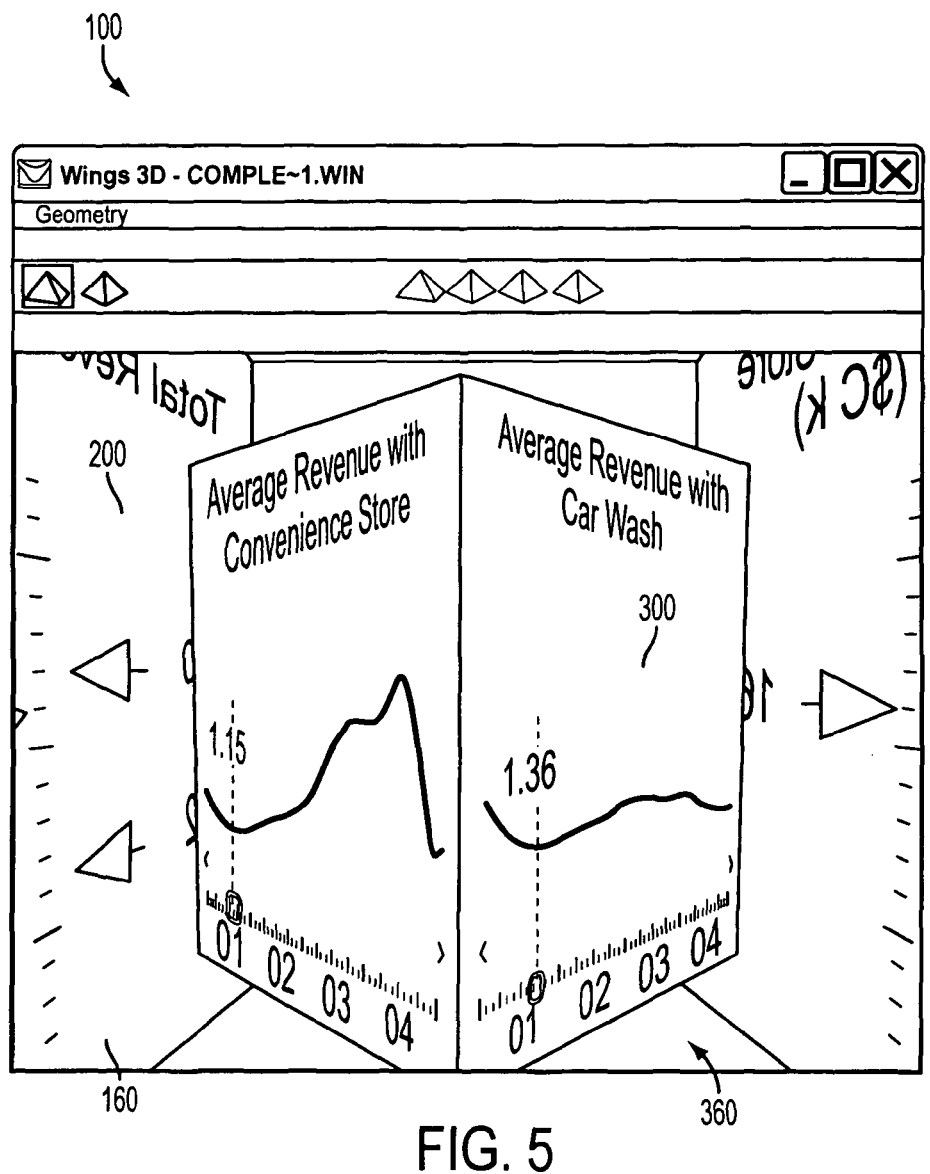
FIG. 5 is an illustration of a panel of the interior solid figure according to the embodiment of the present invention.

In accordance with this aspect of the present invention, the mechanics of the sub-menu 300 are the same as the main menu 200. Namely, when the user points to any panel on the sub-menu 300, as illustrated by FIG. 5, the panel of the sub-menu is rotated and other panels of the sub-menu (in one embodiment of the present invention) come into view of the user. The panels of the sub-menu can also be programmed to rotate continuously until intervention by the user (e.g. activation of the mouse, key, etc.).

The sub-menu panel will remain visible until the user activates another menu. If the solid figure 360 continuously rotates and if the user pauses or leaves the cursor over the sub-menu panel, the panel referred to by the user will freeze, and then continue rotating correspondingly as other sub-menu panels are referenced. Once the user, however, moves back to the main menu via the sub-menu panel, the sub-menu is reduced to the interior of the menu. While the sub-menu "shrinks" on the screen, the main menu "grows" to substantially the same size as the sub-menu size prior to its reduction. When the user points back to a main menu panel, the view of that panel is increased accordingly as it receives a user's commands, while all other panels including the sub-menu become recessed in the background, and occupy very little screen display area.

Furthermore, after the user moves within the menu away from the particular main menu panel, the sub-menu 300 will disappear from the display screen 100, as shown in FIG. 1.

It should be appreciated that if a particular panel in the sub-menu has its own sub-menu 300 associated with that panel referred to by the user, then that sub-sub-menu is displayed on the screen 100 by flowing through the particular sub-menu 300 panel. This is the same zooming effect as accessing the sub-menu 300 from the main menu 200.

It should be appreciated that the main menu 200 and sub-menu 300 may occupy the entire screen, and not only a portion of the screen, as in the previous examples of FIGS. 1 and 3. In this respect, several main menus and/or sub-menus, etc. may appear on the screen arranged in different configurations as noted below.

It should also be appreciated that two or more panels in the main menu can contain the sub-menu symbols. Those panels which are not currently referenced may have their sub-menu symbol not displayed in order to indicate which panel the sub-menu belongs to amongst the main menu panels. Alternatively, a main menu panel may have its sub-menu symbol highlighted, underlined, displayed in a different color, etc. in order to indicate the link with the sub-menu.

Figure 6:
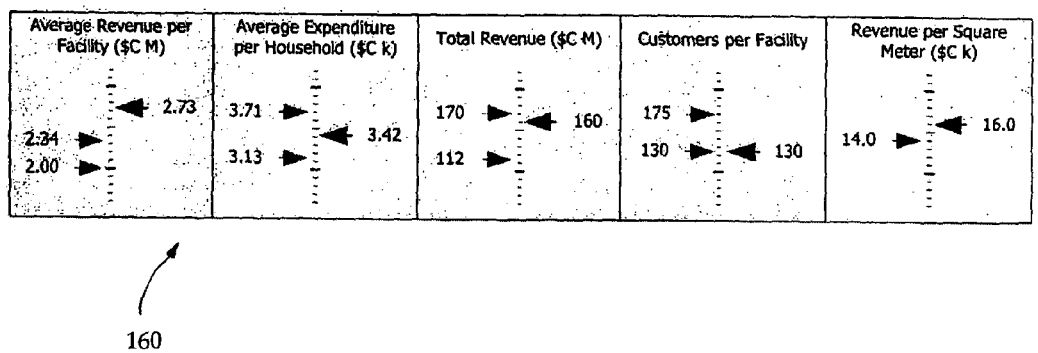
FIG. 6 is an illustration of the solid figure in a flattened view in accordance with another embodiment of the present invention.

In accordance with another aspect of the present invention, as shown in FIG. 6, the first embodiment of the invention, shown in FIGS. 1-5, can be flattened as a solid figure across the display to allow viewing of all of the information at once. Thus, any information including multiple values can benefit from the invention. The user can view and analyze the various panels and information in a format conducive for evaluation. Moreover, multiple tables, charts or maps can be conveniently laid out side by side to display more information on a screen 100. The menus can also be linked together, so as to rotate in a coordinated union. Relative data can be revealed in the others and vice versa.

In accordance with another aspect of the present invention, the solid figure 160 can rotate as a pulley as indicated by arrows 600 and a long series of information could be drawn across the panels of the solid figure. The belt (reel of information) running on the pulley could theoretically be infinitely long and the amount of information presented practically unlimited.

Figure 7:
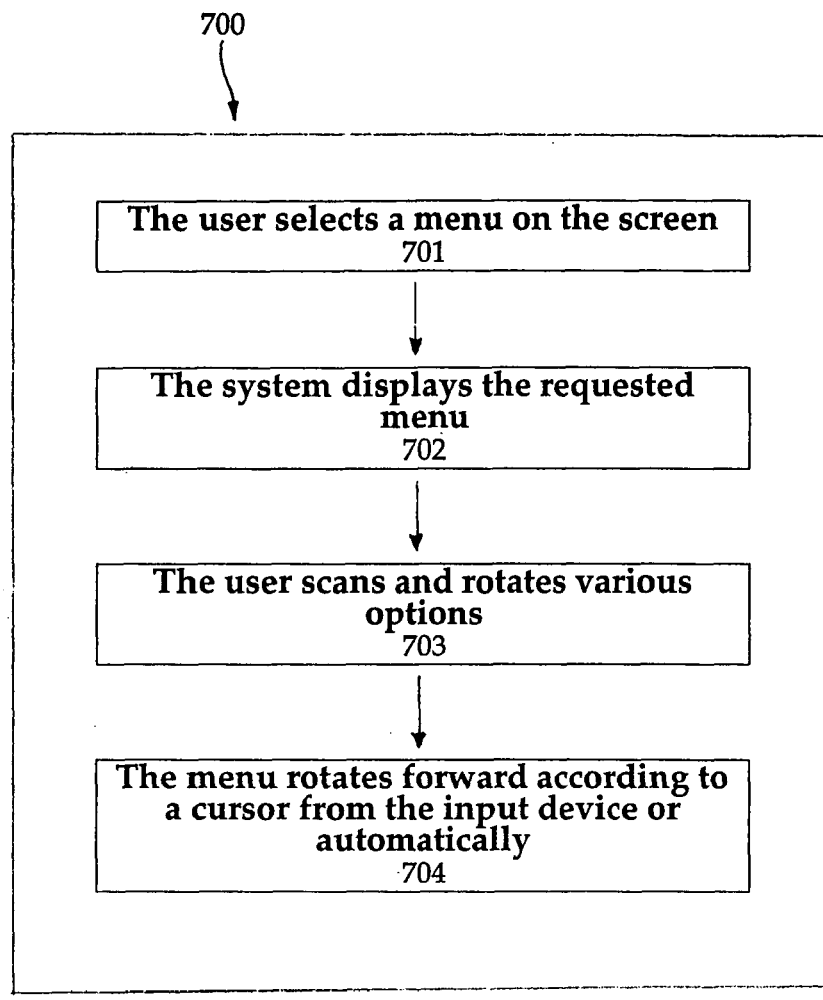
FIG. 7 is a flowchart showing the operation for displaying information according to the present invention.
Figure 8A:
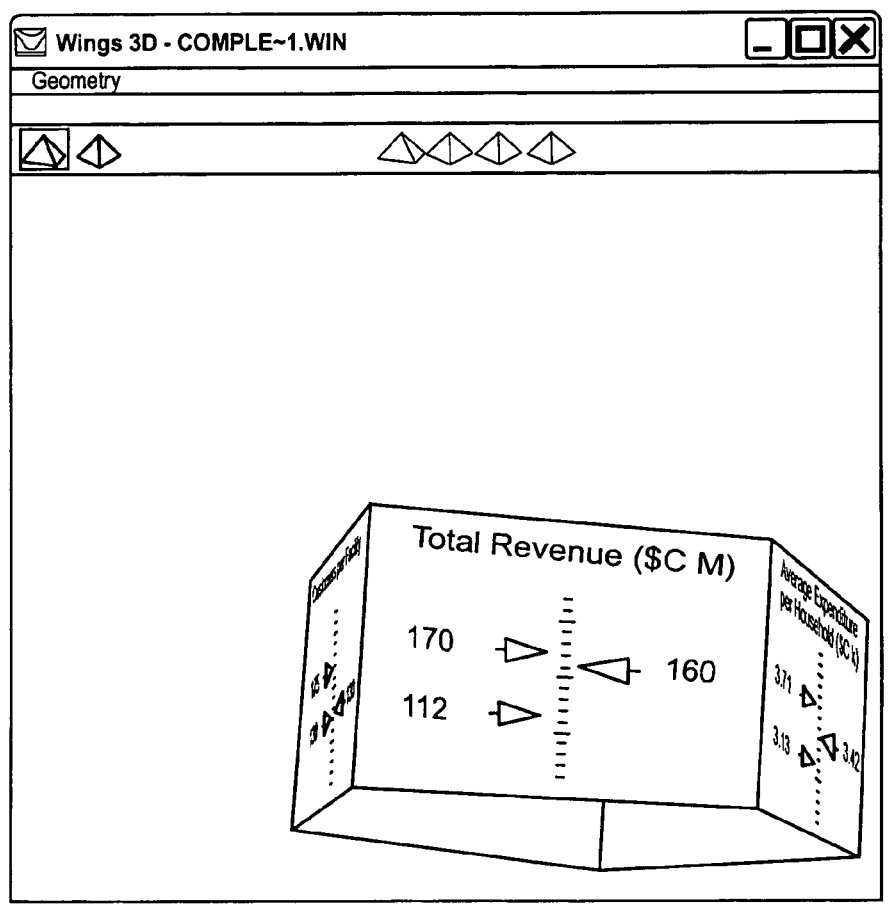
FIGS. 8A-8I are an illustration of another embodiment of the present invention.
Figure 8B:
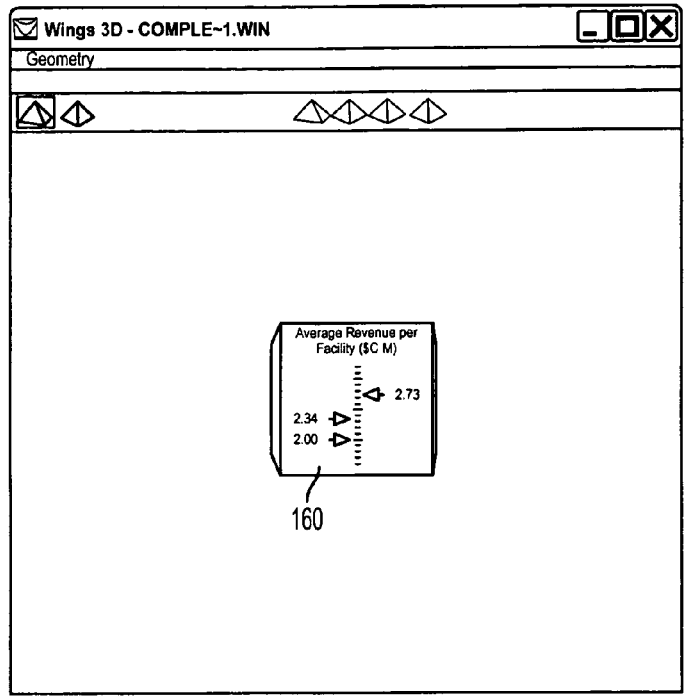
Figure 8C:
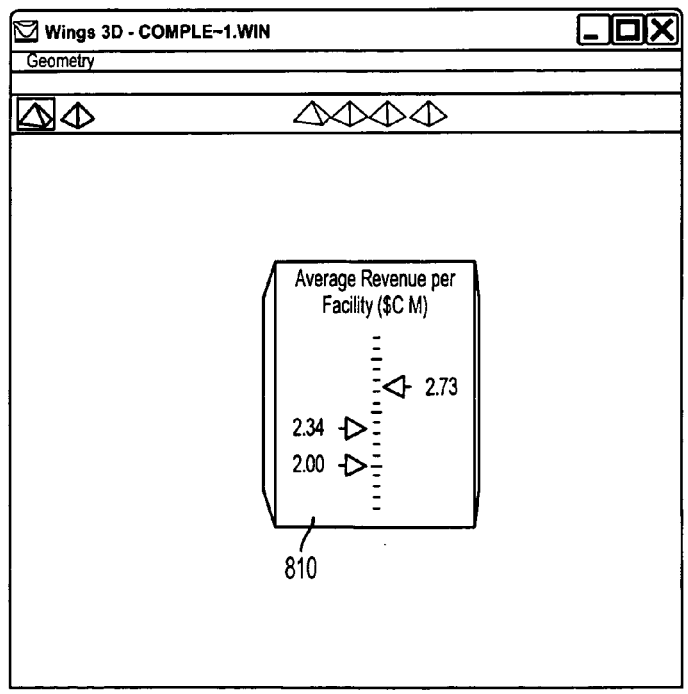
Figure 8D:
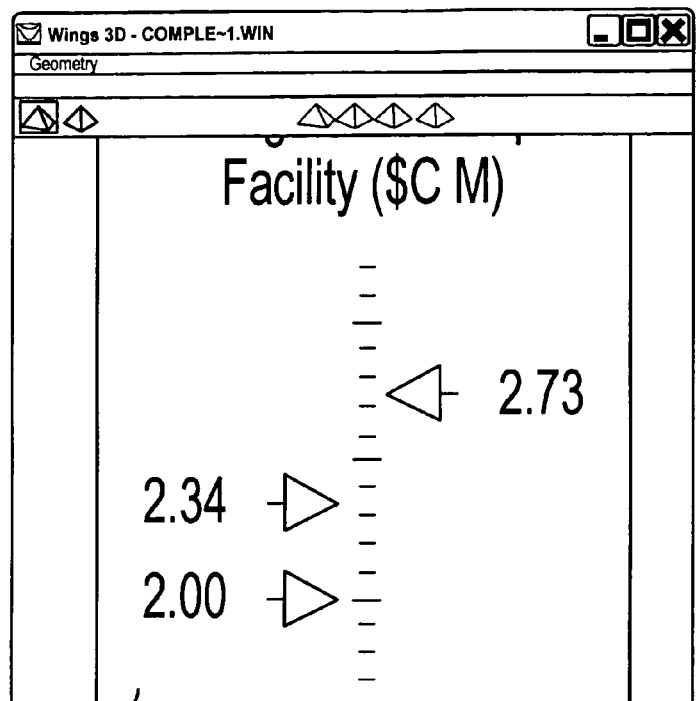
Figure 8E:
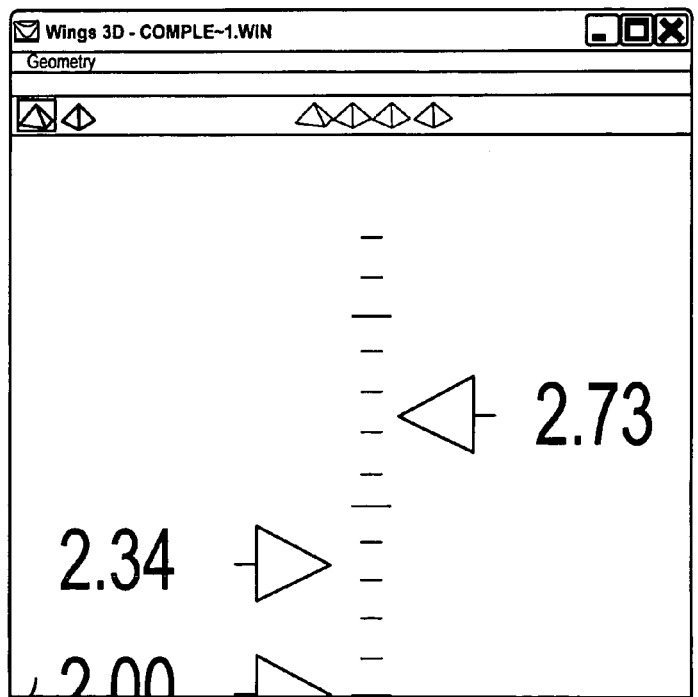
Figure 8F:
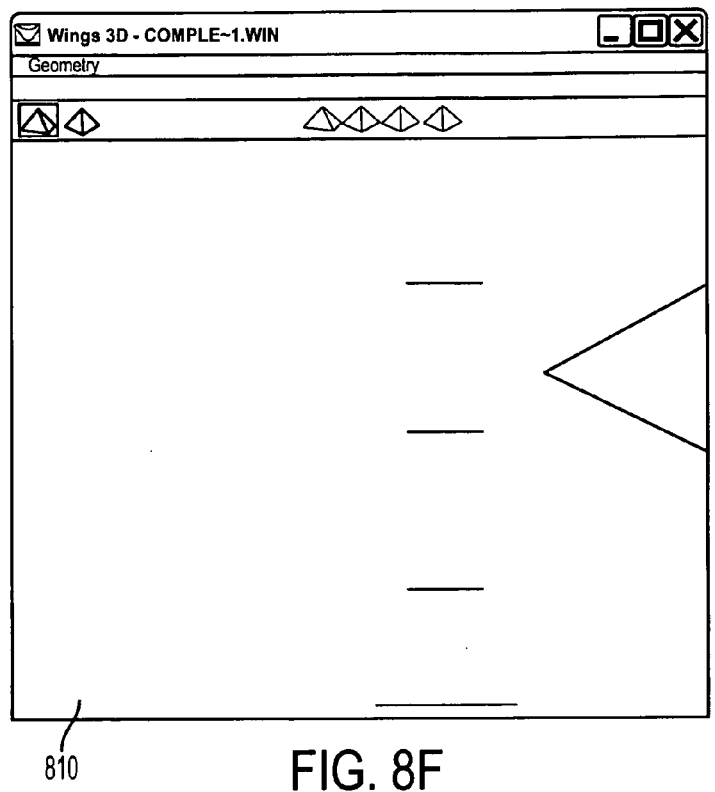
Figure 8G:
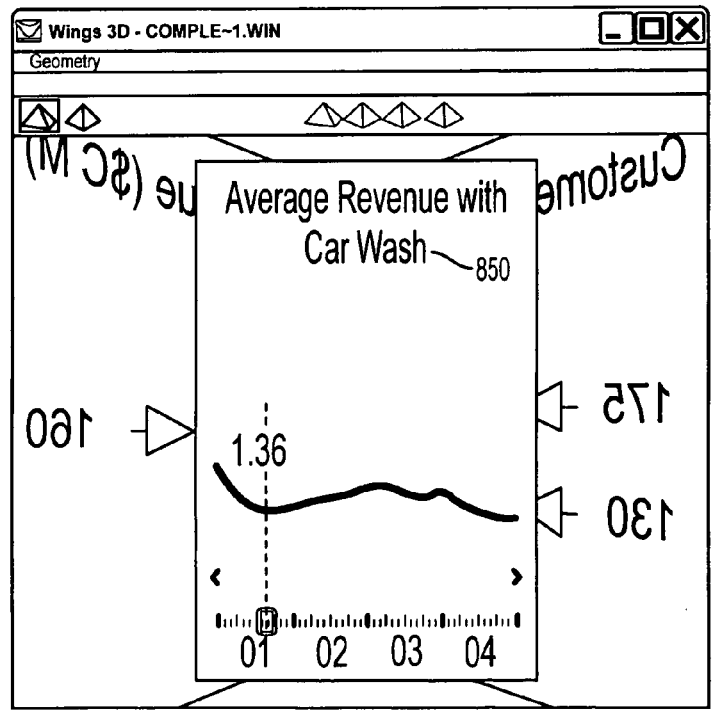
Figure 8H:
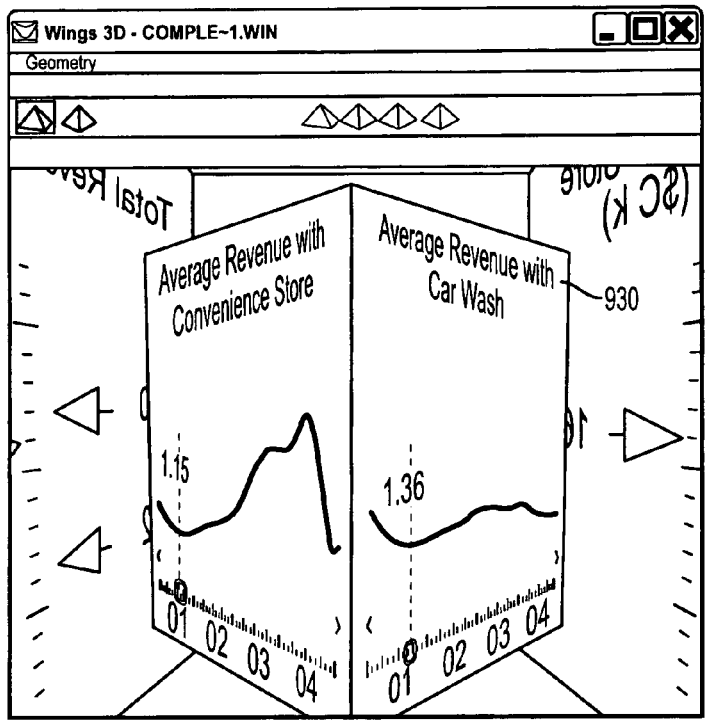
Figure 8I:
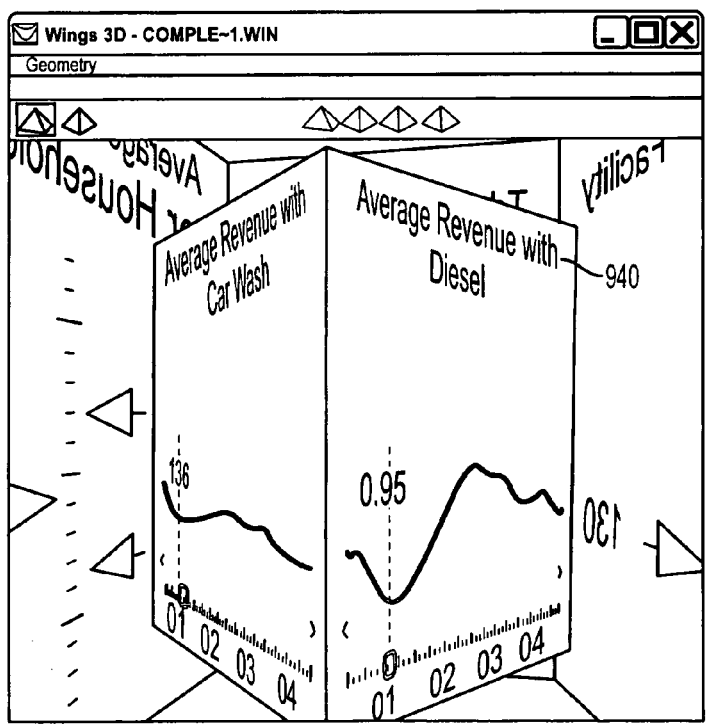

FIG. 7 is a flowchart representing the operation of a processor 700 for displaying menu panels in accordance with the present invention. At step 701, the user selects a menu on the screen, and the system displays the requested menu in step 702. The user, via an input device, scans and rotates various options (i.e., menu panels) in the menu in step 703: each option identified by a cursor from the input device "rotates forward" in step 704.

According to the present invention, all of the menus and their corresponding panels may appear relatively small on the display screen, except for the menu and/or panel of interest to the user as indicated by a cursor, for example. This configuration allows many panels to be displayed on a single screen without requiring the user to perform the scrolling operation for additional menu panels.

It will also be appreciated that the menus in the previous examples do not necessarily have to be the shape of a cylinder. Without detracting from the present invention, the menus may appear in various shapes and in any arrangement: cubes, pentagons, tubes, arcs, etc. Nor is there a reason to limit the solid figure to a flat sided cylinder. Indeed, it could be most useful for comparative analysis for the cylinder to be circular in cross-section so that a user may spin the cylinder and see similarities in graphs or maps.

It will also be appreciated that the solid figures should not be limited to a particular number of sides. The solid figure could have as little as two sides or it could have an infinite number of sides. It appears from experiments that a solid consisting of about twelve sides is a reasonable upper limit.

In accordance with another aspect of the present invention, the method of displaying information on a rotary menu can be used within an analysis of business intelligence. Business intelligence is the process of gathering information in the field of business. It is a category of applications and technologies for gathering, storing, analyzing and providing access to data to help enterprise users make better business decisions. The applications include decision support systems, query and reporting, online analytical processing, statistical analysis, forecasting, data mining, etc.

The prior art tends to display information in a manner that is too cumbersome for analysts. The information is intrusive and difficult to show in the context of the user's interaction with the main display. It is also distracting to the user in that there is an excess of information presented. The present invention makes this information more streamlined, organized and efficient for the common user without the use of complicated spreadsheets. Moreover, the invention allows a user to choose the subject matter that will be the main display and most significant indicator as well as use one or more rotating solid figures to carry the collateral information or menus. Thus, the user can control and minimize the amount of clutter and distraction appearing on the main display.

The present invention would systematize the information onto the three-dimensional solid figure that revolves. The invention would anchor the information to the panels, i.e., 110, 120, 130, 140 and 150, of the solid figure 160.

For example, a petroleum corporation could be studying household utility use as a business model. The panels, as described above, would appear on faces of panels in a cylindrical shaped solid figure 160, as shown in FIG. 2. Vital categories such as Average Revenue per Facility, Average Expenditure per Household, Total Revenue, Customers per Facility, and Revenue per Square Meter could appear on each panel and be analyzed in this manner. The panels of the next available facet could be visible so the user knows which direction to spin the solid. The same technique of searching and probing, as described above in reference to the menu embodiment, would apply in this embodiment to access information.

The petroleum company analyst could quickly identify the relevant information needed to produce reports, charts and graphs. The present invention would display the information to the user in a manner that could be easily seen and easily manageable. Referring now to FIGS. 8A-8I, should the user require to see the details behind a menu 810 or other display, he need only "fly through" the face of the menu panel 810 on the solid figure 160 to reveal a contextual solid menu panel 850 behind the summary menu 810. Flying through is the graphic effect of zooming through the particular panel of the menu 810 to view the panel of another menu 850. For example, the same petroleum company analyst if studying the "Average Revenue per Facility" panel 810 could access a more detailed, panel or multiple-panel analysis of information that was summarized by the summary menu. The sub-menu could reveal detailed information such as statistics regarding Average Revenue with Car Wash 920, Average Revenue with Convenience Store 930, Average Revenue with Diesel 940, etc.

Figure 9:
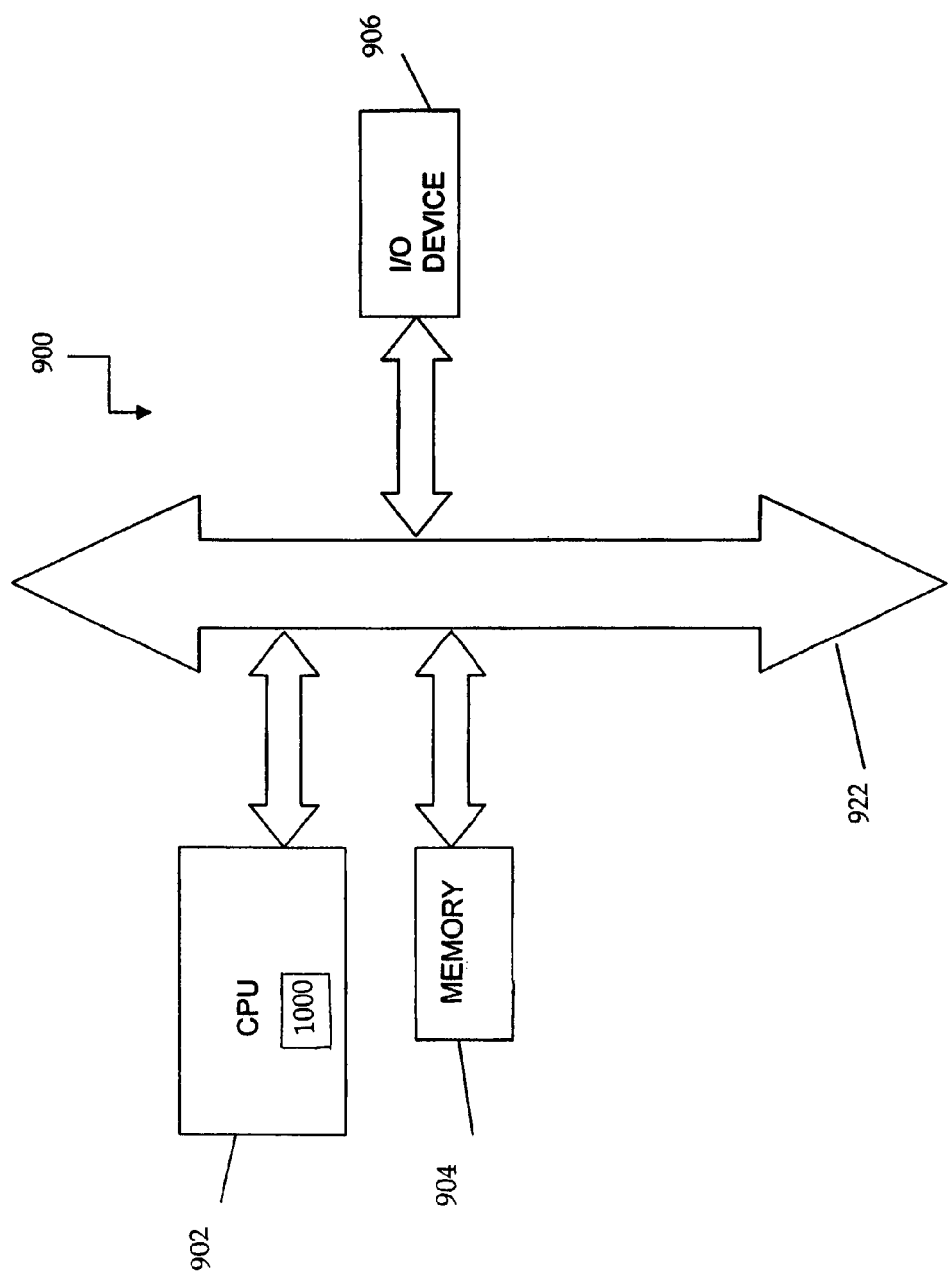
FIG. 9 is a processor system including the present invention.

FIG. 9 shows system 900, a typical processor based system modified to include the system for displaying information 1000 of the present invention. Examples of processor based systems, which may employ the system for displaying information 1000, include, without limitation, computer systems, machine vision systems, vehicle navigation systems, video telephones, surveillance systems, and others.

System 900 includes a central processing unit (CPU) 902 that communicates with various devices over a bus 922. Some of the devices connected to the bus 922 provide communication into and out of the system 900, illustratively including an input/output (I/O) device 906 and system for displaying information 1000. Other devices connected to the bus 922 provide memory, illustratively including a CPU 902 incorporating the system for displaying information 1000 illustrated in FIG. 1. While one input/output device 906 is shown, there may be multiple I/O devices such as a CD-ROM, hard drive, floppy disk, display, and keyboard as well as others. The system for displaying information 1000 may also be combined with a processor, such as a memory, digital signal processor, or microprocessor, in a single integrated circuit.

It will be appreciated that the business intelligence model examples would not only be limited to the petroleum utility example used here. The model could be used with any type of business during any type of study. For example, under any type of business model, a user can display and/or systematize charts, forms for setting parameters, maps, pictures and videos. These displays can have hundreds of variables that can be set by the user and can be used in various analyses to make a single decision. The present invention is simply a means for displaying information to a user using the sides of a solid figure which can be rotated.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed as new and desired to be protected by Letters Patent of the United States is:

1. A method of displaying information comprising the steps of:
   displaying a first three dimensional information panel arrangement, which can be rotated on a display;
   displaying information on a side of said first three dimensional information panel arrangement;
   accessing a second three dimensional information panel arrangement through a selection on the side of the first three dimensional information panel arrangement;
   displaying the second three dimensional information panel arrangement within said first three dimensional information panel arrangement, which can be rotated on a display;
   whereby content displayed on the second three dimensional information panel arrangement is a function of the side of the first three dimensional information panel arrangement through which the second three dimensional information panel arrangement was accessed;
   displaying information on a side of said second three dimensional information panel arrangement;
   rotating said first three dimensional information panel arrangement to display another side of said first three dimensional information panel arrangement; and rotating said second three dimensional information panel arrangement to display another side of said second three dimensional information panel arrangement.

2. The method of claim 1, wherein the step of rotating said three dimensional information panel arrangements is controlled by user interaction.

3. A computer system for displaying information comprising:
   a display; and
   a processor connected to said display, said processor being programmed to perform the steps of:
   displaying a first three dimensional information panel arrangement which can be rotated on a display;
   displaying information on a side of said first three dimensional information panel arrangement;
   accessing a second three dimensional information panel arrangement through a selection on the side of the first three dimensional information panel arrangement;
   displaying the second three dimensional information panel arrangement within said first three dimensional information panel arrangement, which can be rotated on a display;
   whereby content displayed on the second three dimensional information panel arrangement is a function of the side of the first three dimensional information panel arrangement through which the second three dimensional information panel arrangement was accessed;
   displaying information on a side of said second three dimensional information panel arrangement;
   rotating said first three dimensional information panel arrangement to display another side of said first three dimensional information panel arrangement; and
   rotating said second three dimensional information panel arrangement to display another side of said second three dimensional information panel arrangement.

4. The computer system of claim 3, wherein the step of rotating said three dimensional information panel arrangements is controlled by user interaction.

5. The computer system of claim 3, wherein the step of displaying the three dimensional information panel arrangement's further displays at least a second side of the information panel arrangements.

6. The computer system of claim 3, wherein the step of displaying information on a side of said second three dimensional information panel arrangement comprise displaying at least one side of information.

7. The computer system of claim 3, wherein said processor can further perform the step of:
   flattening said three dimensional information panel arrangements for displaying all sides of the information panel arrangements at once.

* * * * *